United States Patent Office 3,474,082
Patented Oct. 21, 1969

3,474,082
POLYMERIZATION OF ETHYLENE TO HIGH MOLECULAR WEIGHT SUBSTANTIALLY LINEAR THERMOPLASTIC POLYETHYLENE
Thomas Joseph Kealy, Wilmington, Del., assignor to E. I. du Pont de Nemours and Company, Wilmington, Del., a corporation of Delaware
No Drawing. Filed Apr. 28, 1965, Ser. No. 451,622
Int. Cl. C08f 1/28, 1/56
U.S. Cl. 260—94.9                                    11 Claims

ABSTRACT OF THE DISCLOSURE

Process for producing high molecular weight substantially linear thermoplastic polyethylene by contacting ethylene with a catalytic amount of an iodo-rhodium compound in the presence of a diluent at from 60° C. to 125° C. and at a pressure between 50 and 3000 atmospheres, and, recovering said polyethylene.

---

It has been discovered that ethylene can be polymerized to form high molecular weight, substantially linear, thermoplastic polyethylene by contacting ethylene with a catalytic amount of an iodo-rhodium compound in the presence of a diluent selected from: acidified water, lower aliphatic alcohols and lower aliphatic ketones, at a temperature in the range between 60 and 125° C. and at a pressure in the range between 50 and 3000 atmospheres, preferably 200–800 atmospheres.

The catalysts of this invention are iodo-rhodium compounds. Rhodium forms an extremely insoluble triiodide, in contrast to the chloride and bromide salts, which are soluble in water. In general, when rhodium compounds are mixed with iodine or other compounds containing iodide ions such as hydroiodic acid, insoluble, dark precipitates are formed which are probably rhodium triiodide having defects in the crystal lattice. Rhodium triiodide, and such precipitates consisting principally of iodo-rhodium compounds form the catalysts of the present invention.

Examples of rhodium compounds which are suitable precursors for the catalysts of the present invention are tetrakis(ethylene)-$\mu$-dichloro-dirhodium made by reacting rhodium trichloride trihydrate with ethylene and bis-(ethylene)-rhodium acetonylacetonate. Preferably at least two iodine atoms should be present for each rhodium atom in the catalyst mixture. Decreasing the ratio of I/Rh below 2 generally gives substantially decreased yields of polymer. In most instances little improvement in catalytic efficiency is obtained using I/Rh ratios greater than 3, and in same instances increasing the I/Rh ratio above 3 resulted in decreased yields.

The preferred solvent for the reaction is water. It has been found that sufficient acid should be present to produce a pH of about 2 or less. The usual mineral acids such as sulfuric acid, nitric acid, hydroiodic acid, hydrochloric acid and hydrobromic acid can be employed. The particular acid employed is not critical, but hydrogen iodide is preferred. Strong organic acids such as aliphatic and aromatic sulfonic acids are also suitable.

The reaction can also be conducted in non-aqueous polar solvents, particularly the lower aliphatic alcohols such as methanol, ethanol, propanol, isopropanol and the butanols, and lower aliphatic ketones such as acetone, methyl ethyl ketone and methyl isopropyl ketone. In the case of the non-aqueous solvents the acidity of the reaction medium is far less important than when water is employed, nevertheless it is preferable that the reaction medium be acidified.

The temperature at which the reaction is conducted should be between 60° C. and 125° C. At lower temperatures the reaction is slower than at higher temperatures. On the other hand at higher temperatures butene forms as a by-product. The optimum temperature varies from solvent to solvent. For aqueous solutions the optimum yield of polyethylene is from about 100 to about 125° C. For ethanol the optimum temperature is from about 70 to about 90° C.

With respect to the pressure, pressures of 50 to 3000 atmospheres are suitable. In general the yield of polymers tends to be lower at lower pressures. Pressures above 1500 atmospheres require expensive equipment and accordingly are not preferred. The preferred range of pressure is from 200–800 atmospheres, pressues in this range provide good yields with operating economy.

The contacting step may be carried out in any suitable pressure vessel. It is also contemplated to conduct the reaction in high pressure flow systems such as tubular reactors.

The principal solid product of the reaction is a high density substantially linear polymer of ethylene, typically having a density in the range between 0.94 and 0.97 gms./cc. and having a crystalline melting point above 120° C. and frequently above 130° C. These polymers are known in the art as articles of commerce, and are generally sold as "linear polyethylene." The product polyethylenes made by the process of this invention are insoluble in water, alcohols and ketones, and can accordingly be separated from the reaction medium by conventional methods for the separation of solid from a liquid phase such as filtration, centrifugation, decantation and the like. If desired, the polyethylene may be dissolved in hydrocarbon or halogenated hydrocarbon solvents at elevated temperatures the solution treated to remove the catalyst residues, then reprecipitated by cooling or by the addition of a non-solvent such as an alcohol to the solvent.

An important advantage of this invention is that the polymerization reaction does not require the exclusion of water, as is the case with many prior art processes for the production of linear polyethylene.

This invention is further illustrated by the following examples, which are not however intended to fully delineate the scope of this discovery.

Example I

A mixture of 0.5 grams of bis-(ethylene)-rhodium-acetylacetonate, 0.5 grams of iodine, 0.33 gram of potassium iodide and 25 grams of water was stirred at room temperature under nitrogen for two hours. This afforded a dark mixture containing a black solid. After 2 ml. of aq. HI (ca. 5.5 molar) had been added, ca. 0.1 grams of the solid was removed for solubility tests. An additional 2 ml. of aq. HI was added to the remainder of the reaction mixture, and the mixture was diluted with water to a volume of ca. 40 ml. to give a calc. pH of the mixture of ca. 0.26 and an iodine atom/rhodium atom ratio of 5. After ca. sixteen hours at room temperature, this mixture was charged to a 0.011-l. stainless steel shaker tube. The tube was flushed with nitrogen, cooled and evacuated. Ethylene was introduced, and the mixture was warmed to 125° C. as more ethylene was gradually added so that a final pressure of 3000 atm. was obtained. Thereafter the pressure was maintained near 3000 atm. during 6.5 hrs. by adding additional ethylene as needed. The reaction mixture was cooled, and the shaker tube was vented slowly through a trap cooled in an acetone-solid carbon dioxide bath to collect any low boiling product. The contents of the tube were then discharged to obtain a suspension which was filtered. The solid was washed with water and with methanol to obtain six parts of solid polyethylene. The polymer was purified by extraction into hot toluene in order to remove catalyst residues. The white polymer recovered from the toluene solution had the typical properties of a highly linear polyethylene. The polymer was insoluble in boiling carbon tetrachloride, afforded a highly opaque film and had a melting point above 125° C. The film was brittle.

Example II

A 0.35-l. stainless steel shaker tube was charged with 0.5 grams of bis-(ethylene)-rhodiumacetylacetonate 8 ml. of HI (aq.), 6 grams of sodium dodecylbenzenesulfonate and 100 parts of water to give a mixture having a calc. pH of 0.39 and a I/Rh. ratio of 22. The tube was flushed with nitrogen, cooled and evacuated. Ethylene was added, and the mixture was warmed to 125° C. as the ethylene pressure was gradually raised so that a pressure of 500 atm. was finally reached. Thereafter the pressure was maintained near 500 atm. during 6 hours by adding ethylene as needed. The tube was cooled to room temperature, vented slowly through a trap cooled in an acetone-solid carbon dioxide bath and the contents were then discharged to obtain a suspension. The suspension was filtered, and the solid was washed with water and with acetone to obtain 10 grams of polymer. The crude polymer could be pressed to a smooth, stiff, tough film indicative of a high molecular weight linear polyethylene. A portion of the polymer was purified by dissolution in boiling xylene. The purified polymer afforded a tough, opaque film having a density of 0.961 g./ml.

Example III

A 0.35-l. stainless steel shaker tube was charged with 1 gram of $RhI_3$, 3 grams of p-toluene sulfonic acid and 100 grams of water to give a mixture of pH (calc.3 0.82. The reaction was conducted and the polymer was isolated as in Example II to obtain 11.5 grams of crude polymer which could be pressed to a smooth, stiff, tough film indicative of a high molecular weight linear polyethylene.

Example IV

A 0.35-l. stainless steel shaker tube was charged with 1 gram of $RhI_3$, 0.5 grams of p-toluene sulfonic acid and 50 ml. of ethyl alcohol to give a mixture with a pH (calc.) of 1.3. The tube was flushed with nitrogen, cooled and evacuated and some ethylene was added. As the reaction mixture was warmed to 75° C., more ethylene was introduced so that a final pressure of 500 atm. was reached. Thereafter the pressure was maintained near 500 atm. during six hours by adding additional ethylene. The tube was cooled to room temperature, vented through a cold trap and the contents were then discharged. The product suspension was filtered and the polymer was washed with acetone to obtain 34 grams of solid polymer which could be pressed to a smooth, stiff, tough film indicative of high molecular weight linear polyethylene. A portion of the polymer was purified and found to have a density of 0.959 g./ml.

Example V

A 0.35-l. stainless steel tube was charged with 0.5 grams of bis-(ethylene)-rhodium acetonylacetonate, 0.5 grams of iodine, 0.4 gram of p-toluene sulfonic acid and 50 ml. of ethyl alcohol to give a mixture with a pH (calc.) of 1.4 and an I/Rh of 2. The run was then carried out as in Example 4 to obtain 23 grams of polymer which could be pressed to a smooth, stiff, tough film. If the procedure is repeated substantially using a higher proportion of $I_2$, for example an iodine atom to rhodium atom ratio of 8, the yield of polymer is substantially lower.

Example VI

Example IV was repeated except that 1 gram of p-toluene sulfonic acid was used, to give a mixture with a pH (calc.) of 1.0, and the pressure was 200 atm. to obtain 29.7 grams of linear polyethylene of high molecular weight.

Example VII

A 0.35-l. stainless steel shaker tube was charged with 0.2 grams of p-toluene sulfonic acid and a mixture of 0.5 grams of bis-(ethylene)-rhodiumacetonylacetonate and 0.5 grams of iodine in 50 ml. of acetone to give a mixture with pH calc. of 1.7 and an I/Rh of 2. The shaker tube was flushed with nitrogen cooled and evacuated, and some ethylene was introduced. As the mixture warmed to 90° C., additional ethylene was added so that a final pressure of 500 atm. was reached. During six hours the pressure was maintained near 500 atm. by adding ethylene as needed. The polymer was isolated in the usual way to obtain 8 grams of high molecular weight linear polyethylene, a purified sample of which gave a density value of 0.953 g./ml.

Example VIII

Three runs were conducted for six hours each in an agitated 0.11-liter reactor at 125° C. and 3000 atmospheres pressure. In each case 0.002 gram-mole of bis (ethylene)rhodium acetylacetonate, 0.021 gram-mole of potassium iodide, and 40 grams of water were charged to the reactor. Ethylene was charged and the pressure regulated as described in Example I. The amount and type of acid added to the reaction mixture prior to heating was varied as indicated below. Upon completion of each run, the linear polyethylene obtained was isolated by the procedure set out in Example II. The effect of the pH can be seen from the following data:

| Gram-Moles of Acid | Calc'd pH | Grams of polyethylene |
|---|---|---|
| 0.021 (p-toluene sulfonic) | 0.28 | 12.3 |
| 0.002 (p-toluene sulfonic) | 1.3 | 2.6 |
| 0.0005 (acetic) | 3.3 | Nil |

What is claimed is:

1. A process for the production of high molecular weight substantially linear thermoplastic polyethylene which comprises contacting ethylene with a catalytic amount of an iodo-rhodium compound, in which compound the iodine to rhodium ratio is at least about 2, in the presence of a diluent selected from the class consisting of acidulated water having a pH of about 2 or less, lower aliphatic alcohols, and lower aliphatic ketones, at a temperature in the range between 60° and 125° C. and at a pressure between 50 and 3000 atmospheres, and recovering substantially linear polyethylene from the reaction mixture.

2. Process of claim 1 in which the iodo-rhodium compound is rhodium triiodide.

3. Process of claim 1 in which the iodo-rhodium compound is the product of mixing bis-(ethylene)-rhodiumacetonylacetonate with an iodo compound selected from the class consisting of iodine and hydrogen iodide.

4. Process of claim 2 in which the diluent is acidulated water.

5. Process of claim 4 in which the temperature is from about 100° C. to about 125° C.

6. Process of claim 2 in which the diluent is ethanol.

7. Process of claim 6 in which the temperature is from about 70° C. to about 90° C.

8. Process of claim 3 in which the diluent is acidulated water.

9. Process of claim 3 in which the temperature is from about 100° C. to about 125° C.

10. Process of claim 3 in which the diluent is ethanol.
11. Process of claim 10 in which the temperature is from about 70° C. to about 90° C.

References Cited

UNITED STATES PATENTS

| | | | |
|---|---|---|---|
| 3,013,066 | 12/1961 | Alderson | 260—486 |
| 3,166,547 | 1/1965 | Loeb | 260—94.9 |
| 3,328,378 | 6/1967 | Piekarski et al. | 260—94.9 |
| 3,296,227 | 1/1967 | Burleigh et al. | 260—94.3 |
| 3,303,156 | 2/1967 | Dauby et al. | 260—94.3 |

JOSEPH L. SCHOFER, Primary Examiner

E. J. SMITH, Assistant Examiner